April 8, 1941.  J. F. BARRY  2,237,326

APPARATUS FOR MEASURING ACCELERATION

Filed Feb. 23, 1938

INVENTOR
J. F. BARRY
BY
[signature]
ATTORNEY

Patented Apr. 8, 1941

2,237,326

UNITED STATES PATENT OFFICE 2,237,326

APPARATUS FOR MEASURING ACCELERATION

Joseph F. Barry, Brooklyn, N. Y., assignor to Bell Telephone Laboratories, Incorporated, New York, N. Y., a corporation of New York Application February 23, 1938, Serial No. 191,918

4 Claims. (Cl. 73—51)

This invention relates to an apparatus for determining the acceleration given a body by an accelerating force of unknown magnitude.

In using various materials of construction it is desirable and many times quite necessary to know the properties of such materials when subjected to transient or impact forces. Such forces are of very short duration and usually reach very large magnitude. Particularly is this true in the case of collision between certain elastic materials of great density even though colliding at moderate velocities. It is also desirable to know the maximum acceleration given a vibrating body, for example, in concrete forms while the concrete is being compacted by mechanical compacters in order to determine the effect on such forms as well as the effective compacting range of the mechanical compacter. Of the foregoing examples it is evident that many uses for an accurate instrument for measuring acceleration will readily be found in the fields of vibration engineering and material testing.

The object of this invention is to provide a relatively simple instrument which can be readily applied to measuring both the acceleration and the accelerating force acting on a mechanical system.

A further object is to provide an apparatus which is peculiarly adapted to measuring the impact forces acting upon a mechanical system during collision as well as the resulting acceleration produced thereby.

In accordance with the foregoing objects this invention provides an instrument comprising a measuring body of known mass, an elastic means having substantially no mass and adapted to cooperate with said body to hold it against the stop, means for indicating the force magnitude of said elastic means and signaling means for indicating the separation of said body from said stop.

The manner and means whereby this invention attains the above stated objects will best be understood by referring to the accompanying drawing in which.

Figure 4:
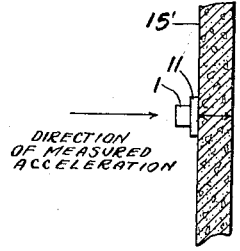

Fig. 4 discloses another application wherein the invention is specifically applied to the measurement of the acceleration imparted to a portion of a vibrated concrete wall.

The simple laws of acceleration have long been known and the equation for the acceleration $a$ of a mass $m$ under an unbalanced force $f$ is quite familiar and may be expressed as follows:

$$a = \frac{f}{m} \qquad (1)$$

It is also well known that if mass $m$ is being given an acceleration $a$ there will be a resisting force $f$ exerted by the mass which opposes this acceleration, the relationship being mathematically the same as expressed by Equation 1. Now, if this body of known mass $m$ is biased against a mechanical stop by a force of magnitude $f_b$ both the body and the stop may be accelerated in the direction of the stop by applying an accelerating force F to the stop member. It can be seen that there will be no separation of the mass from the stop so long as the acceleration produced by the force F is less than $a$ as expressed by Equation 1 because in this case the resisting force $f$ is less than the biasing force $f_b$. When the acceleration produced by the force F equals $a$, the resisting force $f$ is just balanced by the biasing force $f_b$. It is obvious, of course, that in order to have a biasing force as described it is essential that this force react against the stop through a suitable mechanical linkage. Then when the accelerating force F acts against the stop it will carry the body with it through the medium of the biasing force means provided the acceleration does not produce a force greater than the biasing force, in which event the body will separate from the stop.

Figure 1:
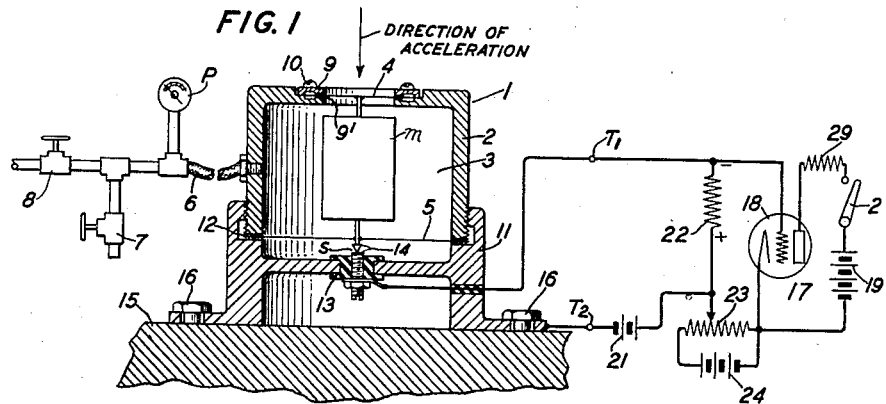
Fig. 1 represents a schematic showing the essentials of a preferred form adapted to impact measurement.

In Fig. 1 the invention is shown in the form of an exploring cell 1 which comprises a shell 2 within which is an air-tight chamber 3. Within this chamber is mounted a body having a known mass $m$ and which is preferably so mounted that it is in dynamic balance and is responsive to forces acting in one direction only. This is accomplished by mounting body $m$ to the centers of two oppositely disposed parallel diaphragms 4, 5, the line connecting said two diaphragm centers passing normal to their faces and through the center of mass of body $m$. Although preferable for simplicity, it is not absolutely essential that this line pass normal to the faces of the diaphragm for it is obviously possible to have the line at an angle and determine the constants of the system from the moment of inertia of the body $m$ in a manner well known. Diaphragms 4, 5 are preferably made no heavier than necessary to withstand the maximum air pressure which may be applied thereto. This is in order to reduce the effective mass which would introduce an error when not negligible compared with that of the body $m$.

Chamber 3 is sealed from atmosphere by seals 9' and 12 associated with diaphragms 4 and 5, respectively. Annular plate 9 secures diaphragm 4 and seal 9' to shell 2 by means of screws 10 while diaphragm 5 and its seal 12 are secured by the threaded joint between shell 2 and base 11. A flexible pipe 6 connects chamber 3 to an air supply which is controlled by cocks 7 and 8. A suitable gauge P is connected in pipe 6 so as to indicate the pressure in chamber 3. Contacts 14 are arranged as indicated so that the movable contact is integral with the diaphragm 5 and the stationary contact is integral with stop S. Stop S is in the form of a set screw insulated from the base 11 by means of insulator 13 and is so adjusted that when chamber 3 has atmospheric pressure contacts 14 barely close. Diaphragms 4 and 5 are of different diameter so that an unbalanced pressure may be exerted by diaphragm 5 against stop S.

Contacts 14 form a part of the signaling system which is shown in Fig. 1 as a circuit including an electron discharge device 18 of the gas-filled trigger type. Terminals $T_1$ and $T_2$ connect to the stationary and movable contacts, respectively. This kind of signal circuit is used because of the extreme speed required of such a system while making impact tests. The relatively high inductive impedance circuit of Fig. 2 would not be suitable for such tests as will be more clearly explained later. Tube 18 has a cold cathode, an anode and a control grid. The positive bias supplied by potentiometer 23 from battery 24 is of such magnitude as to positively fire tube 18. Resistor 22 contains no reactance and its cooperation with battery 21 maintains an opposing bias so long as contacts 14 are closed. This opposition bias is sufficient to just keep tube 18 from firing. Battery 19 through switch 20 furnishes the necessary anode current which is limited by resistor 29. When tube 18 fires its sustained glow is a visual signal that contacts 14 have momentarily opened. The circuit may be reset by opening and closing switch 20.

Figure 2:
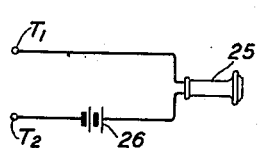
Fig. 2 shows another form of signaling device suitable for slower acceleration.

The signaling circuit of Fig. 2 comprises a telephone receiver 25 and battery 26, the operation of which is obvious. This circuit is much simpler, but is adaptable only where the open time of contact 14 is of sufficiently long duration to permit such a high reactance circuit to function. It is well known that such circuits are substantially unresponsive to relatively high frequencies and short interval transients. However, where measuring relatively long time interval accelerations and accelerating forces such a device is preferred because of its simplicity.

Although it is preferred, it is not necessary that the pressure employed in chamber 3 be greater than atmospheric as pressures below atmospheric may be supplied and gauge P be a vacuum gauge instead of a pressure gauge. If this is done it is obvious that diaphragm 4 must be larger in diameter than diaphragm 5 in order that contacts 14 will be urged together as the degree of vacuum increases.

Figure 3:
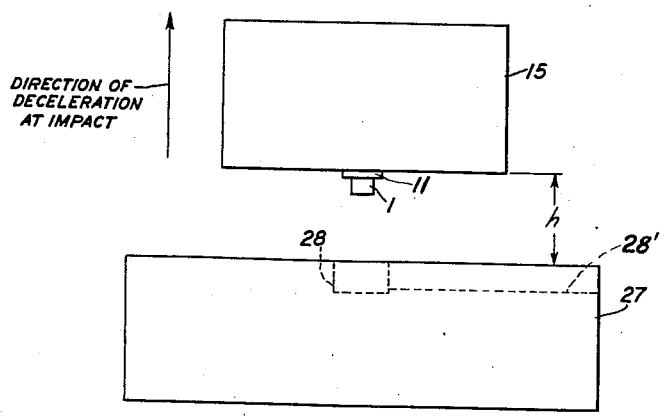
Fig. 3 shows in elementary form an application of the apparatus of Fig. 1.

In Fig. 3 free body 15 corresponds to body 15 of Fig. 1 where cell 1 is shown attached thereto by bolt 16 to insure that frame 11 with stop S will always have the same instantaneous velocity and acceleration as that of body 15. It should be noted that in Fig. 3 cell 1 is shown inverted from the disclosure of Fig. 1. This is because in Fig. 3 the rate of deceleration at impact is to be measured while Fig. 1 discloses the general case of a body 15 about to be accelerated in the direction indicated by the arrow. In so far as mass $m$ is concerned, the effect is the same in either case. The force measuring and signaling apparatus has been deleted for clarity. Body 15 whose mass is known is allowed to fall to body 27 through a distance $h$ having at the instant of impact a known kinetic energy. Beginning at the instant the bodies meet there will begin a very rapid deceleration of body 15 which amounts to an acceleration in the direction indicated by the arrow. The effect of the impact on the measuring mass $m$ is that it is decelerated at the same rate as cell 1 and mass 15 and consequently exerts a resisting force $f$ which opposes the biasing force $f_b$. Now assuming that this acceleration is just sufficient to barely open contact 14 momentarily, that is, the acceleration is such that the resisting force exerted by the measuring mass $m$ of Fig. 1 slightly overbalances the bias force produced by the air pressure on the diaphragm 5. Tube 18 will be fired. Of course, if the contacts did not open, successive trials at smaller and smaller pressures will have to be made until the desired condition is reached. It will be seen that this force value is substantially equal to the unbalanced bias force exerted by diaphragm 5 and gauge P may be graduated, if desired, to read this force directly. Since the bias force is substantially equal to the force of acceleration on body $m$, the acceleration may be found by Equation 1. Furthermore, since the mass of body $m$ is constant and known, the scale of gauge P may be made to read acceleration directly. Pocket 28 and trough 28' are made in body 27 to receive cell 1, flexible tube 6 and the conductors leading to terminals $T_1$ and $T_2$ without injury.

Because the mass of body 15 and the mass of the entire cell 1 are also known, the total accelerating force F upon the system may be obtained from the following equation where M represents the sum of the two above-mentioned masses:

$$F = Ma = \frac{Mf}{m} \qquad (2)$$

It should be kept in mind that the aceleration and forces measured are the maximum ones.

Various materials to be tested may be placed between the two colliding bodies and tests may be run to determine their impact properties. Also, the cell 1 may be mounted or held against a vibrating member at the point where it is desired to measure the maximum acceleration. This is shown in Fig. 4 where cell 1 is against a portion of a concrete wall 15' which is being vibrated as indicated by the double-headed arrow. If the acceleration is small enough the cell may be held by hand but if it is so great as to make this impossible the cell must be mounted to the wall by clamps or bolts such as bolt 16 in Fig. 1 to be sure that the cell will always be given the same acceleration as the wall. It is to be understood that while the cell is specifically disclosed as mounted to a concrete wall it may be mounted in the same manner to a machine frame, a concrete form during vibratory compacting of the poured concrete or any other similar vibrated or otherwise accelerated body. As previously stated the cell is responsive to accelerations in one direction only as indicated by the single-headed arrow of Fig. 4. It is only important to have the acceleration acting normal to the base of the cell and in a direction away from the base. Also, the frame 11 with its stop S must remain with the member whose acceleration is to be measured in order to get an accurate determination.

What is claimed is:

1. An apparatus for measuring accelerations comprising two oppositely disposed parallel diaphragms of substantially different diameters, a measuring body of known mass mounted on the mid-points of said diaphragms, a stop therefor, pneumatic elastic means cooperating with said diaphragms and adapted to act directly through the center of mass of said body and to forcibly hold said body against said stop, means for indicating the force magnitude of said elastic means, and signaling means for indicating the withdrawal of said body from said stop.

2. An apparatus for measuring accelerations comprising two oppositely disposed parallel diaphragms of substantially different diameters, a measuring body of known mass mounted on the mid-points of said diaphragms, the line connecting said two points being normal to said two diaphragms, a stop therefor, pneumatic elastic means cooperating with said diaphragms and adapted to act directly through the center of mass of said body and to forcibly hold said body against said stop, means for indicating the force magnitude of said elastic means, and signaling means for indicating the withdrawal of said body from said stop.

3. An apparatus for measuring accelerations comprising two oppositely disposed parallel diaphragms of substantially different diameters, a measuring body of known mass mounted on the mid-points of said diaphragms, a stop therefor, a gas-tight chamber having said diaphragms comprising portions of opposite walls thereof, means for introducing a gas within said chamber, means for controlling the pressure thereof to hold said body against said stop with a known force and signaling means for indicating the withdrawal of said body from said stop.

4. An apparatus for measuring accelerations comprising two oppositely disposed parallel diaphragms of substantially different diameters, a measuring body of known mass mounted on the mid-points of said diaphragms, the line connecting said two points being normal to said two diaphragms, a stop therefor, a gas-tight chamber having said diaphragms comprising portions of opposite walls thereof, means for introducing a gas within said chamber, means for controlling the pressure thereof to hold said body against said stop with a known force, and signaling means for indicating the withdrawal of said body from said stop.

JOSEPH F. BARRY.